United States Patent
Gao et al.

(10) Patent No.: US 10,560,696 B2
(45) Date of Patent: Feb. 11, 2020

(54) METHOD FOR INITIAL QUANTIZATION PARAMETER OPTIMIZATION IN VIDEO CODING

(71) Applicant: TFI Digital Media Limited, Hong Kong (HK)

(72) Inventors: Wei Gao, Hong Kong (HK); Sam Tak Wu Kwong, Hong Kong (HK); Chi Keung Fong, Hong Kong (HK); Hon Wah Wong, Hong Kong (HK); Hon Tung Luk, Hong Kong (HK); Hok Kwan Cheung, Hong Kong (HK); Yiu Fai Yuen, Hong Kong (HK)

(73) Assignee: TFI DIGITAL MEDIA LIMITED, Hong Kong (HK)

( * ) Notice: Subject to any disclaimer, the term of this patent is extended or adjusted under 35 U.S.C. 154(b) by 45 days.

(21) Appl. No.: 16/016,691

(22) Filed: Jun. 25, 2018

(65) Prior Publication Data
US 2019/0394466 A1 Dec. 26, 2019

(51) Int. Cl.
*H04N 19/124* (2014.01)
*H04N 19/159* (2014.01)
*H04N 19/172* (2014.01)

(52) U.S. Cl.
CPC ......... *H04N 19/124* (2014.11); *H04N 19/159* (2014.11); *H04N 19/172* (2014.11)

(58) Field of Classification Search
None
See application file for complete search history.

(56) References Cited

U.S. PATENT DOCUMENTS

| 10,325,352 | B1* | 6/2019 | Kim | G06T 3/4046 |
| 2018/0139450 | A1* | 5/2018 | Gao | H04N 19/147 |
| 2019/0020871 | A1* | 1/2019 | Xu | H04N 19/124 |

(Continued)

OTHER PUBLICATIONS

K. P. Lim, G. Sullivan, and T. Wiegand, "Text Description of Joint Model Reference Encoding Methods and Decoding Concealment Methods," JVT-O079, Busan, Korea, pp. 1-40, Apr. 2005.

(Continued)

*Primary Examiner* — Dave Czekaj
*Assistant Examiner* — Shanika M Brumfield
(74) *Attorney, Agent, or Firm* — Idea Intellectual Limited; Margaret A. Burke; Sam T. Yip (57) ABSTRACT

A machine learning based initial quantization parameter (QP) prediction method, which can effectively optimize RC performance A machine learning framework for initial QP prediction is proposed, where learning labels are built with the criterion of maximizing rate-distortion (RC) performance, which is proved to be much more effective than the QP determination method with the only consideration on sum of the absolute transformed difference (SATD) complexity. Instead of target bits per pixel for intra frame, target bits per pixel for remaining frames is used as sample data to avoid empirically setting intra frame bit allocation, thus improve the prediction accuracy as the real-time updated remaining bits can better reflect the real-time requirements on the level of QPs. In addition, a clipping and decision approach based on the previous initial QP and the target bits per pixel for all remaining frames is proposed, which can help fast QP adaption and quality smoothness.

13 Claims, 7 Drawing Sheets

(56) References Cited

U.S. PATENT DOCUMENTS

2019/0132591 A1* 5/2019 Zhang .................. H04N 19/124
2019/0158834 A1* 5/2019 Jung .................... H04N 19/126

OTHER PUBLICATIONS

H. Wang and S. Kwong, "Rate-distortion optimization of rate control for H.264 with adaptive initial quantization parameter determination," IEEE Trans. Circuits Syst. Video Technol., vol. 18, No. 1, pp. 140-144, Jan. 2008.

M. Yang, J. C. Serrano and C. Grecos, "MPEG-7 Descriptors Based Shot Detection and Adaptive Initial Quantization Parameter Estimation for the H.264/AVC," IEEE Trans. Broadcasting, vol. 55, No. 2, pp. 165-177, Jun. 2009.

S. Hu, H. Wang, S. Kwong and C. C. J. Kuo, "Novel Rate-Quantization Model-Based Rate Control With Adaptive Initialization for Spatial Scalable Video Coding," IEEE Trans. Ind. Electron., vol. 59, No. 3, pp. 1673-1684, Mar. 2012.

* cited by examiner

| Initial QP methods | | JVT-O079 [1] | TCSVT-2008 [2] | TBC-2009 [3] | TIE-2012 [4] | HM-16.14 [5] |
|---|---|---|---|---|---|---|
| Influential factors | Source of target bpp | From all available bandwidth | From all available bandwidth | From all available bandwidth | From all available bandwidth | From intra frame allocated bits |
| | Source of coding complexity | None | EI and IM | Edge vector amplitude | MBV and SAD | SATD |
| Determination approach | | Four fixed values | Calculation-based | Calculation-based | Calculation-based | Calculation-based |
| Video coding standard | | H.264/AVC | H.264/AVC | H.264/AVC | H.264/SVC | H.265/HEVC |

| Tasks | Video Sequences |
|---|---|
| Training | PartyScene, RaceHorsesC, BasketballPass, BlowingBubbles, BQSquare, RaceHorses, FourPeople, Johnny, KristenAndSara |
| Testing | PeopleOnStreet, Traffic, BasketballDrive, BQTerrace, Cactus, Kimono, ParkScene, BasketballDrill, BQMall |

| Feature set | FS1: {Tbpp} | FS2: {SATD} | FS3: {Tbpp, SATD} |
|---|---|---|---|
| $\gamma$ | 100 | 3.1623 | 31.6228 |
| b | 24.0132 | 23.4657 | 23.2011 |
| SV nums | 54 | 53 | 54 |
| $R^2$ | 0.8947 | 0.0140 | 0.6904 |
| RMSE_wor | 3.7965 | 5.7331 | 4.4458 |
| RMSE_wr | 3.8055 | 5.7381 | 4.4701 |

FIG. 7

METHOD FOR INITIAL QUANTIZATION PARAMETER OPTIMIZATION IN VIDEO CODING

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to rate control (RC) in video coding. Particularly, the present invention relates to a machine learning based method for initial quantization parameter (QP) prediction for rate control optimization in video coding.

BACKGROUND

Due to the limited bit rate resources and quality dependency among frames, video coding performance is very sensitive to the QP configuration for the initial intra frame in RC. In video coding, each intra period is started with an intra coded frame, for which the initial QP determination is one of the key steps of RC initialization. The difficulty of obtaining a desirable initial QP comes from two reasons: 1) bit resources are always limited and bit allocation for intra frame actually means the trade-off on coding bit resources between intra frame and following inter frames; 2) the quality dependency between intra frame and following inter frames makes the bit allocation more complex. Therefore, the optimal initial QP determination can be deemed as a trade-off problem between intra and inter frames. Similarly, the precise problem modeling and accurate model parameters for optimal initial QP are difficult to achieve.

Figure 1:
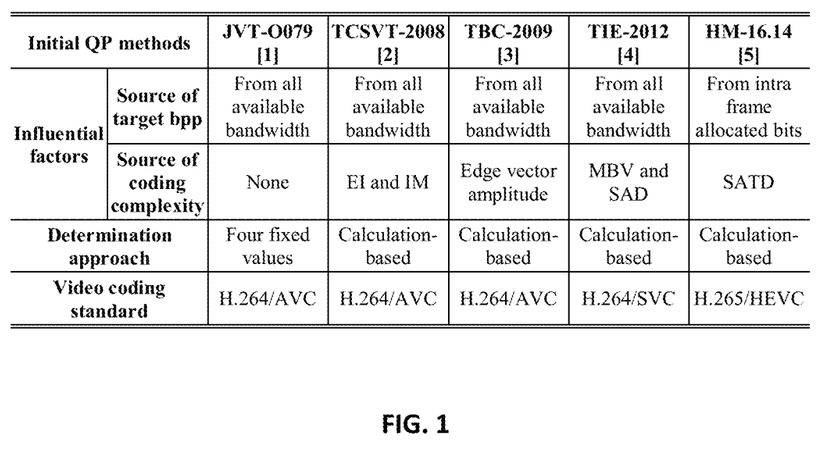
FIG. 1 shows a table listing existing typical non-learning based methods on initial QP determination.

Regrettably, there is very little literature on refining RC initialization, particularly on using machine learning to find the optimal solution of initial QP. The existing typical non-learning based methods for initial QP determination are listed in a table in FIG. 1, which usually use two categories of influential factors: 1) target bit per pixel related, and 2) intra coding complexity related.

An early typical initial QP determination method is disclosed in JVT-0079 [1] for H.264/AVC, where three thresholds on target bit per pixel from the available bandwidth are used to set four fixed QPs. In TCSVT-2008 [2], the coding complexity is modeled with relation to entropy information and INTRA16 DC mode. In TBC-2009 [3] for H.264/AVC, the information of the edge vector amplitudes is considered to be related to the coding complexity. In TIE-2012 [4] for H.264/SVC, from intra frame and among specific frames, macroblock based variance (MBV) and sum of absolute difference (SAD) are extracted to generate the evaluation metric for coding complexity of intra coded content. It should be noticed that the above coding complexity related features may not be easily available in High Efficiency Video Coding (HEVC) and future video coding due to their high correlations with the particular coding tools in H.264/AVC and H.264/SVC. Therefore, it is better to make the coding complexity related feature independent of coding tools for easy adoption in future video coding.

Many of the model parameters in the existing calculation based initial QP determination methods are empirically achieved, and even differently configured for different videos with diverse resolutions. Therefore, the achieved model parameter cannot always be reliable for other different videos. These existing methods actually lack guarantees to obtain robustness for the coding performances achieved ultimately.

Another critical problem for the existing initial QP determination methods is the lack of effective optimization goals such that the efforts for optimization are useless for any of RC optimization goals, as well as for video coding performances. In general, the main RC optimization goals include improved R-D performance, lower quality fluctuations, higher bit rate achievement, and stable buffer occupancy control. Some existing initial QP methods evaluate coding distortion only to identify the best scheme, which is not accurate since different initial QPs will have different results on bit rate mismatch. The critical influence of initial QP on the overall video coding is embodied in the fact that different initial QPs will generate different coding results on both average bit rates and distortions. Although some conventional frame-level and block-level RC algorithms endeavor to make the final achieved bit rates be close to target bit rates, it will definitely fail for some unsatisfactory options of initial QPs. Therefore, it is obviously unacceptable to just compare the coding distortions to give the R-D performance evaluation and it is desirable to have an effective RC optimization scheme.

For HEVC, the latest reference software HM-16.14 [5] provides a unique R-$\lambda$ model-based method for initial QP determination and parameter updating. Besides target bit per pixel of the current intra frame, the sum of the absolute transformed difference (SATD) is exploited as the coding complexity. The drawback of this initial QP determination method in HM-16.14 may easily come from the introduced inaccuracy from the empirical setting for the allocated bits of intra frame. This empirical bit setting makes the optimal initial QP achievement impossible, and then RC performance cannot be effectively optimized. Another problem is that the initial QP is predicted using the modulated R-$\lambda$ model with inaccurate parameters. In fact, there is no guarantee that the intra frame bit allocation is optimal, as well as the accuracy of the final initial QP determination based on the modulated R-$\lambda$ model. Therefore, it is preferable to have a better initial QP approach to avoid the inaccuracy of empirically setting intra frame bit allocation.

REFERENCES

[1] K. P. Lim, G. Sullivan, and T. Wiegand, "Text Description of Joint Model Reference Encoding Methods and Decoding Concealment Methods," JVT-0079, Busan, Korea, April 2005.

[2] H. Wang and S. Kwong, "Rate-distortion optimization of rate control for H.264 with adaptive initial quantization parameter determination," *IEEE Trans. Circuits Syst. Video Technol.*, vol. 18, no. 1, pp. 140-144, January 2008.

[3] M. Yang, J. C. Serrano and C. Grecos, "MPEG-7 Descriptors Based Shot Detection and Adaptive Initial Quantization Parameter Estimation for the H.264/AVC," *IEEE Trans. Broadcasting*, vol. 55, no. 2, pp. 165-177, June 2009.

[4] S. Hu, H. Wang, S. Kwong and C. C. J. Kuo, "Novel Rate-Quantization Model-Based Rate Control With Adaptive Initialization for Spatial Scalable Video Coding,"
*IEEE Trans. Ind. Electron.*, vol. 59, no. 3, pp. 1673-1684,
March 2012.

[5] HM Reference Software 16.14. (2017, August) [Online].
Available: haps://hevc.hhi.fraunhofer.de/svn/svn_HEVC-Software/tags/HM-16.14.

The disclosures of above references are incorporated herein by reference in their entirety.

SUMMARY OF THE INVENTION

The present disclosure relates to machine learning based initial QP prediction method which can effectively optimize RC performance. A machine learning framework for initial QP prediction is proposed, where learning labels are built with the criterion of maximizing rate-distortion (R-D) performance Instead of the traditionally used target bits per pixel for intra frame, the target bits per pixel for remaining frames is used as learning feature to avoid empirical setting for intra frame bit allocation, and thus improve the prediction accuracy since the real-time updated remaining bits can better reflect the real-time requirements on the level of QPs. A support vector regression (SVR) is chosen to perform the machine learning as it is well-known for robustness and simplicity. In addition, a clipping and decision approach based on the previous initial QP and the target bits per pixel for all remaining frames is proposed, which can help fast QP adaption and quality smoothness.

BRIEF DESCRIPTION OF THE DRAWINGS

Embodiments of the invention are described in more detail hereinafter with reference to the drawings, in which:

FIGS. 4A-4E show various relationship between initial QP selection and its corresponding RD score; wherein

FIGS. 6A-6C depict results of learning parameter grid search for prediction error (RMSE) minimization using different feature sets denoted as FS1, FS2 and FS3, respectively; wherein

DETAILED DESCRIPTION

In the following description, methods for predicting initial quantization parameter (QP) for rate control in video coding are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 2:
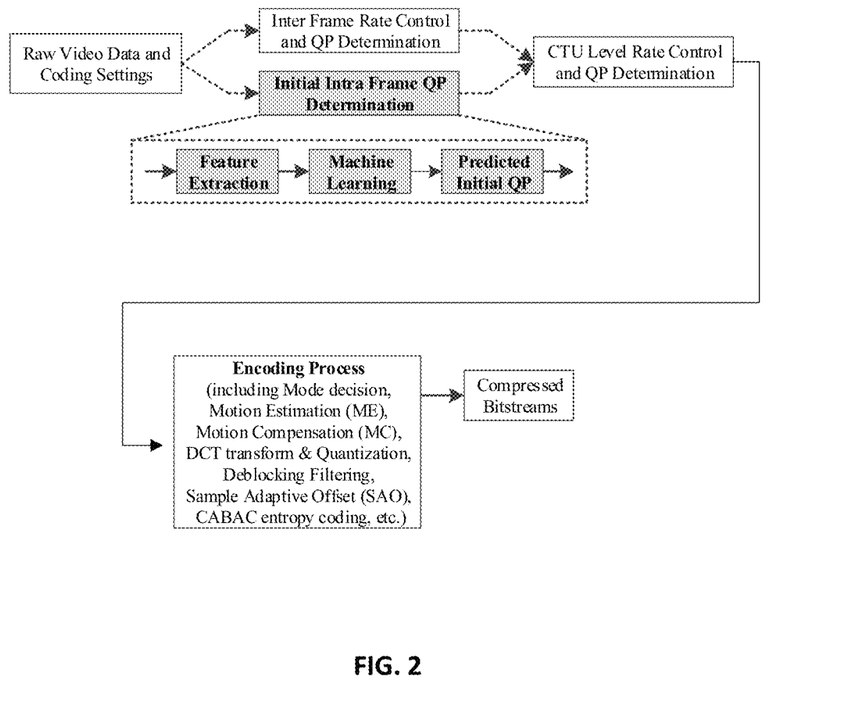
FIG. 2 depicts a framework of a method for determining initial QP for rate control in video coding according to one embodiment of the present invention.

FIG. 2 depicts a framework of a method for predicting an initial QP for rate control in video coding according to one embodiment of the present invention, comprising: receiving an input video; extracting one or more feature vectors from the input video; feeding the extracted feature vector into a machine learning model; and predicting one or more initial QP using the machine learning model.

The process of feature vector extraction may comprise: determining an initial target bit per pixel, $Tbpp_0$, for an initial intra frame in the input video; determining target bits per pixel for remaining frames, Tbpp, in the input video; and extracting feature vector from the determined target bits per pixel for remaining frames, Tbpp.

The initial target bit per pixel, $Tbpp_0$, may be determined by the equation:

$$Tbpp_0 = \frac{TBR}{FR \times FP}, \quad (1)$$

where TBR is the target bit rate, FR is the frame rate and FP is the number of pixels in a frame of the input video, respectively.

The target bits per pixel for remaining frames, Tbpp, may be determined by the equation:

$$Tbpp = \frac{Tbpp_0 \times AFN \times FP - \sum_{i=1}^{CFN} R_i}{(AFN - CFN) \times FP}, \quad (2)$$

where AFN is the total number of frames, CFN is the number of coded frames and $R_i$ is the consumed bits of the i-th frame of the input video, respectively.

The process of machine learning model training may comprise: receiving a test video; extracting sample data from the test video; selecting an optimal initial QP from a plurality of initial QPs on the basis of a criterion of performance optimization; inputting the extracted sample data and corresponding selected optimal initial QP into the machine learning model; and training the machine learning model to obtain a prediction function for initial QP.

The process of sample date extraction for machine learning model training may be similar to the process of feature vector extraction, which comprises: setting a target bit rate for coding the test video; determining an initial target bit per pixel, $Tbpp_0$, for an initial frame in the test video; determining target bits per pixel, Tbpp, for remaining frames in the test video; and extracting sample data from the determined target bits per pixel, Tbpp, for remaining frames.

Similarly, the initial target bit per pixel, $Tbpp_0$, may be calculated with Equation (1) with TBR being the target bit rate, FR being the frame rate and FP being the number of pixels in a frame of the test video, respectively.

Similarly, the target bits per pixel for remaining frames, Tbpp, may be determined with Equation (2), with AFN being the total number of frames, CFN being the number of coded frames and $R_i$ being the consumed bits of the i-th frame of the test video, respectively.

The process of optimal initial QP selection for machine learning model training may comprise: coding the test video with one or more coding schemes having different initial QP values; calculating a rate-distortion (R-D) performance score, RDSi, for each of the coding schemes; and selecting the optimal initial QP value which corresponds the coding scheme achieving the highest R-D performance score.

The rate-distortion (R-D) performance score, $RDS_i$, for an i-th initial QP coding scheme may be determined by the equation:

$$RDS_i = \frac{C_F}{C_i} = \frac{R_F \cdot D_F}{R_i \cdot D_i}, \quad (3)$$

where $R_F$, $D_F$ and $C_F$ are average consumed bits, mean square error (MSE) distortions and residual complexity indicator for a Fixed QP coding, respectively; and $C_i$ is the product of a pair of R-D date of the i-th initial QP coding scheme which is approximated by the equation:

$$C_i = R_i \cdot D_i, \quad (4)$$

where $R_i$ and $D_i$ are consumed bits and mean square error (MSE) distortions of the i-th initial QP coding scheme, respectively.

Figure 3:
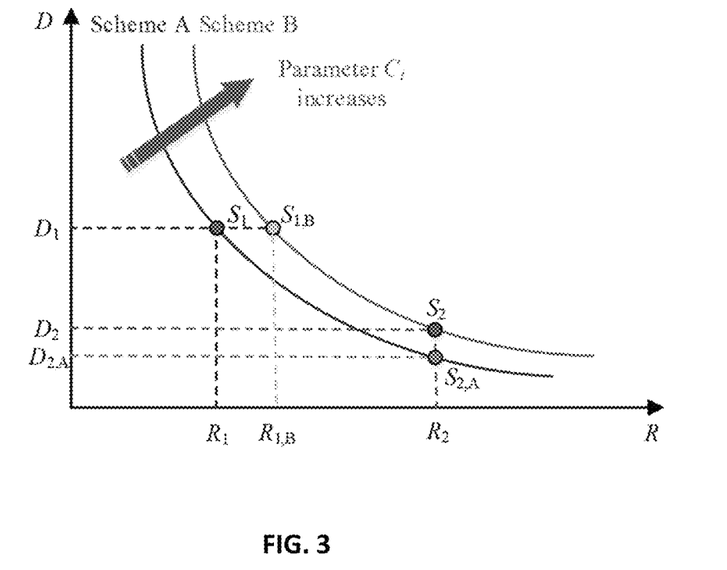
FIG. 3 illustrates coding results of two R-D data pairs and how to determine a better initial QP coding scheme by comparison with the criterion of maximizing R-D performance.
Figure 4A:
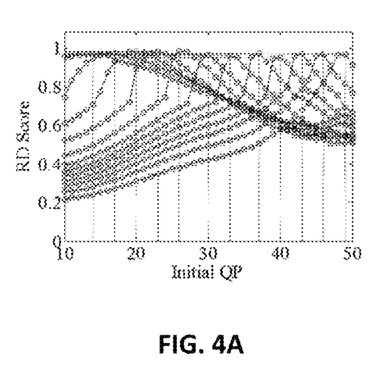
FIG. 4A shows the relationship for video sequence Traffic.
Figure 4B:
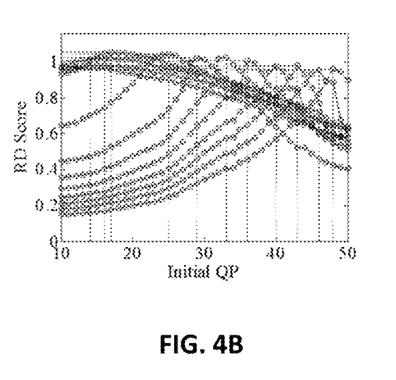
FIG. 4B shows the relationship for video sequence BQTerrace.
Figure 4C:
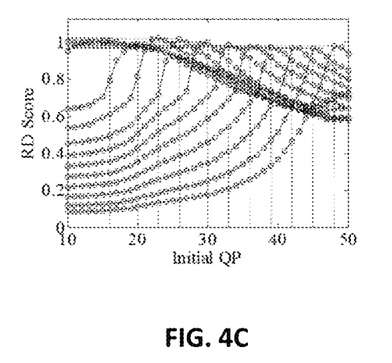
FIG. 4C shows the relationship for video sequence BasketballDrill.
Figure 4D:
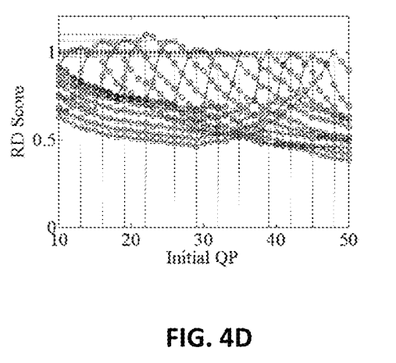
FIG. 4D shows the relationship for video sequence BasketballPass and FIG. 4E shows the relationship for video sequence KristenAndSara.
Figure 4E:
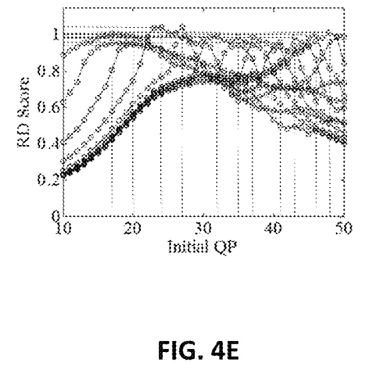

FIG. 3 illustrates how to determine a better initial QP coding scheme by comparing single R-D data pairs with the criterion of R-D performance maximization. There are two coding results of R-D data pairs: $S_1(R_1, D_1)$ and $S_2(R_2, D_2)$ from two different initial QP schemes: A and B. According to the R-D relationship as shown in (2), $C_1 < C_2$. If we extend $S_1$ to the curve of Scheme B at $S_{1,B}$, then $S_{1,B}$ has a larger R at $R_{1,B}$ than $S_1$ at $R_1$, which means that to achieve the same D as Scheme A at $S_1$, Scheme B will need to consume more bits. Similarly, if Scheme A has the same bits as $S_2$ at the curve of Scheme B, $S_{2,A}$ has a lower D at $D_{2,A}$ than $S_2$ at $D_2$. Therefore, we can conclude that Scheme A is better than Scheme B on R-D performance Obviously, we can see that if $C_i$ of Scheme i is smaller, Scheme i can have a better R-D performance Therefore, by comparing $C_i$ of different schemes, we can quickly identify the optimal initial QP that best maximize R-D performance, where only a single R-D data pair is used.

It should be noted that due to the importance of QP to the rate distortion optimization (RDO) processes of mode decision (MD) and motion estimation (ME), different QP strategies will produce different results on residual complexity, namely different R-D characteristics for coding content. Therefore, different initial QP schemes will generate different results on Ci for different coding content. For initial QP determination problem, the variation of RDS can reflect the quality of different initial QP scheme candidates. As mentioned, smaller Ci indicates better R-D performance. Then, by normalizing with the coding results of Fixed QP under the same target bit rates, the largest RDS result indicates the best selection of initial QP for R-D optimization.

FIGS. 4A-4E show various relationship between initial QP selection and its corresponding RD score for video sequences Traffic, BQTerrace, BasketballDrill, BasketballPass and KristenAndSara, respectively. As a non-limiting example, a low delay B coding structure with GOP size of 4 and intra period size of 8 is adopted. The dotted lines indicate the optimal initial QPs and the achieved RD scores at 12 different target bit rates for different video sequences.

Figure 5:
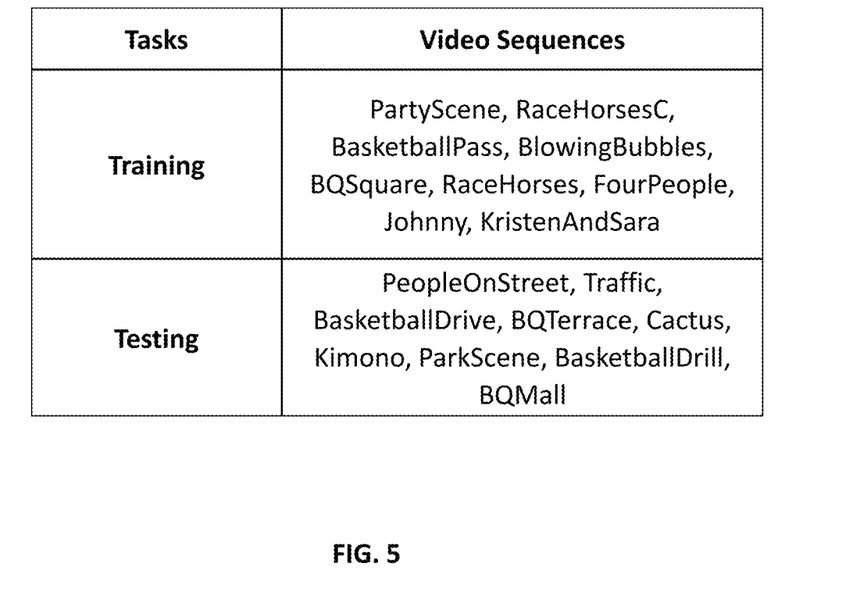
FIG. 5 shows a table listing other video sequences recommended for HEVC coding performance evaluation.

It should be appreciated by those skilled in that art that the video sequences for collecting the benchmark learning labels for initial QP prediction are not limited to those indicated in FIGS. 4A-4E. As shown in a table in FIG. 5, other video sequences recommended for HEVC coding performance evaluation may also be used for training and testing, respectively.

The machine learning model may be a support vector regression (SVR) model which is well-known for robustness and simplicity. However, it should be understood that the SVR is used herein as a non-limiting example and may be replaced with other proper regression algorithms for elevating the prediction accuracy.

In training the SVR machine learning model, a radial basis function (RBF) based kernel trick may be adopted to produce a hyperplane defined as:

$$f(x) = \omega^T \phi(x) + b \quad (5)$$

where $\phi(\cdot)$ is the RBF kernel function, b is the bias term, and $\omega$ is highly related to the support vector coefficients which depict the relationship between the selected support vectors and the learned hyperplane.

The hyperplane may be fine-tuned by minimizing a cost function, J, defined by the model:

$$J = \frac{1}{2}\|\omega\|^2 + C\sum_{i=1}^{n}(\xi_i + \xi_i^*), \text{ s.t. } \begin{cases} y_i - \omega^T \phi(x_i) - b \le \varepsilon + \xi_i^* \\ \omega^T \phi(x_i) + b - y_i \le \varepsilon + \xi_i \\ \xi_i, \xi_i^* \ge 0, \forall i = 1 \ldots n, \varepsilon \ge 0 \end{cases} \quad (6)$$

where $x_i$ and $y_i$ are extracted sample data and corresponding selected optimal initial QP for the i-th test video, respectively, n is number of data samples, $\zeta_i$ and $\zeta_i^*$ indicate slacks, $\varepsilon$ is allowable error and data samples within the $\varepsilon$-tube which will not be penalized, parameter C defines the penalty factor for data samples outside the $\varepsilon$-tube, and parameter $\varepsilon$ determines the sensitivity of error zone and thus influences the number of selected support vectors.

After the SVR machine learning model is trained, an initial QP prediction function, H, may be formulated with the support vector, SV, corresponding support vector coefficients, SVCoef, and the bias parameter, b, which are obtained from the achieved optimal hyperplane, wherein:

$$\text{Pred\_IQP} = H(SV, SVCoef, \phi(x)b) \quad (7)$$

where x is an input feature vector extracted from and Pred_IQP is an initial QP predicted for an input video, respectively.

Figure 6A:
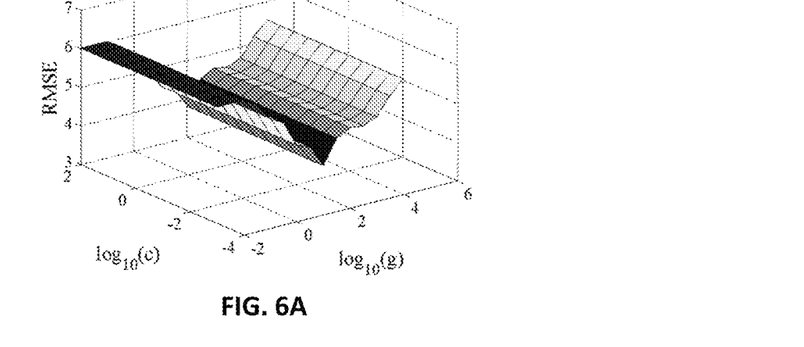
FIG. 6A depicts the results for feature set FS1 using target bits per pixel for remaining frames, Tbpp, only.
Figure 6B:
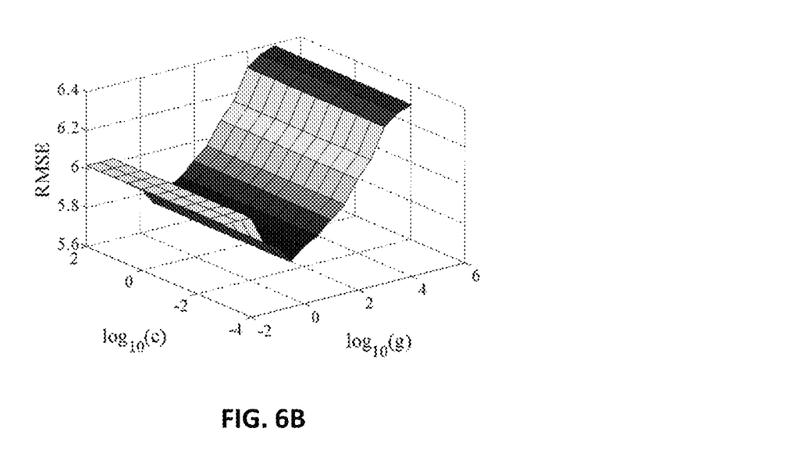
FIG. 6B depicts the results for feature set FS2 using sum of the absolute transformed difference, SATD, only.
Figure 6C:
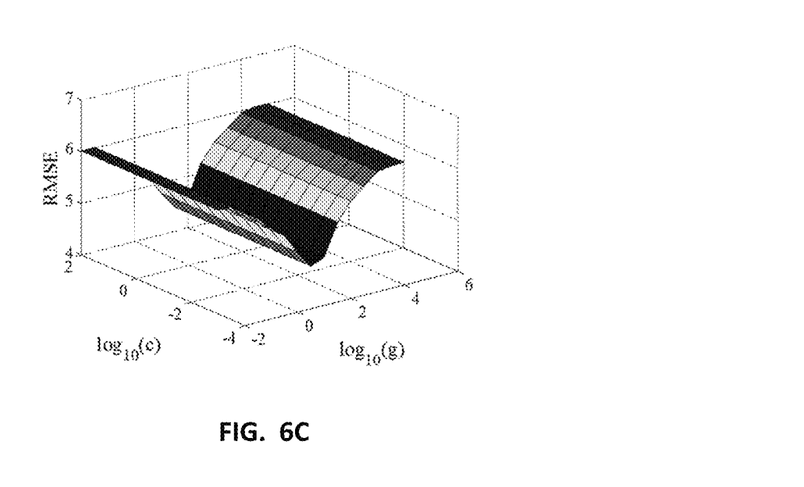
FIG. 6C depicts the results for feature set FS3 using both Tbpp and SATD.

In some embodiments, the prediction errors can be further minimized by tuning learning parameters {g, c} of the machine learning model by grid search, wherein g corresponds to kernel hyperparameter $\gamma$ in RBF kernel function and c corresponds to cost parameter C in $\varepsilon$-SVR, respectively. FIGS. 6A-6C depict results of learning parameter grid search for prediction error (RMSE) minimization using different feature sets. Three different sample data sets denoted as FS1, FS2 and FS3, respectively, are tested. The feature set FS1 consists of target bits per pixel for remaining frames, Tbpp, only; FS2 consists of sum of the absolute transformed difference, SATD, only and FS3 consists of both Tbpp and SATD.

Figure 7:
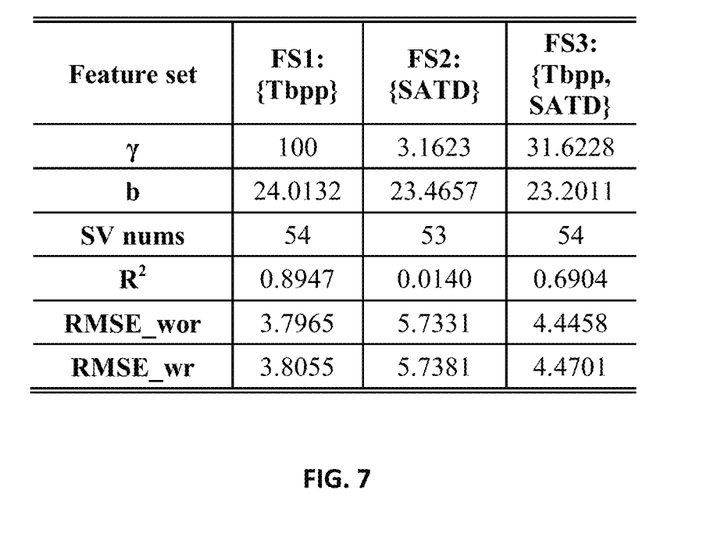
FIG. 7 shows a table comparing the training and testing results for initial QP learning with the criterion of maximizing prediction accuracy based on the three different feature sets FS1, FS2 and FS3, respectively.

FIG. 7 shows a table comparing the training and testing results for the machine learning model trained for initial QP prediction with the criterion of maximizing prediction accuracy based on the three different feature sets FS1, FS2 and FS3, respectively. The fitting accuracy is measured by correlation coefficients, $R^2$, whereas the prediction errors are measured by root MSE (RMSE) of regression results with rounding of QP, denoted as RMSE_wr.

It can be seen in the table of FIG. 7 that $R^2$ achieves 0.8947, 0.0140 and 0.6904 for FS1, FS2 and FS3, respectively. RMSE_wr are 3.8005, 5.7381 and 4.4701 for FS1, FS2 and FS3, respectively. The scheme FS1 using only target bit per pixel of remaining frames provides the minimal prediction error. The scheme FS2 using only the simple SATD cannot give an effective initial QP prediction, and FS3 cannot give a more accurate prediction than FS1. Therefore, by using the machine learning scheme based on feature vectors extracted from target bpp of remaining frames, initial QP prediction error can be narrowed from the wide available QP range of 0~51 to a much smaller range.

In another embodiment according to the present invention, a method for predicting an initial quantization parameter (QP) for rate control in coding a video having one or more intra periods is provided. The method comprises: receiving an input video; extracting one or more feature vectors from each of the intra periods of the input video; feeding the feature vector extracted from the first intra period into a machine learning model; predicting an initial QP for the first intra period using the machine learning model; and determining initial QP for each of following intra periods with a clipping model.

The feature vector extraction comprises: setting a target bit rate for coding the test video; determining an initial target bit per pixel, $Tbpp_0$, for an intra frame for each of the intra periods; determining target bits per pixel, Tbpp, for remaining frames for each of the intra periods; and extracting feature vector from the determined target bits per pixel, Tbpp, for remaining frames for each of the intra periods.

Similarly, the initial target bit per pixel, $Tbpp_0$, is calculated by Equation (1) with TBR being the target bit rate, FR being the frame rate and FP being the number of pixels in a frame of the input video, respectively.

Similarly, the target bits per pixel for remaining frames, Tbpp, are determined by Equation (2), with AFN being the total number of frames, CFN being the number of coded frames and $R_i$ being the consumed bits of the i-th frame of the input video, respectively.

The clipping range for the clipping model is denoted as [min_IQP, max_IQP] and defined by:

$$\text{min\_IQP} = \begin{cases} \text{Prev\_IQP} - deltaQP, & \text{if } Tbpp > Tbpp_0 \\ \text{Prev\_IQP}, & \text{otherwise} \end{cases} \quad (8)$$

and $$\text{max\_IQP} = \begin{cases} \text{Prev\_IQP}, & \text{if } Tbpp > Tbpp_0 \\ \text{Prev\_IQP} + deltaQP, & \text{otherwise} \end{cases} \quad (9)$$

respectively.

where Prev_IQP is the previous initial QP predicted by the machine learning model for the intra frame at the previous intra period, deltaQP is the clipping value, $Tbpp_0$ and Tbpp are the initial target bit per pixel of the intra frame and the target bit per pixel of the remaining inter frames in a following intra period respectively.

If the clipping parameter, deltaQP, is too large, it will make the predicted initial QP choose a possible large value which achieves good R-D performance by sacrificing quality smoothness. If the clipping parameter, deltaQP, is too small, it will make the learning algorithm fail to work, since the allowable range for initial QP is very limited. Preferably, the clipping parameter, deltaQP, may be set to 2 or 3.

The clipping model may also be defined by:

$$\text{Pred\_IQP} = \begin{cases} \text{Prev\_IQP} - deltaQP, & \text{if } Tbpp > \eta_1 Tbpp_0 \\ \text{Prev\_IQP} + deltaQP, & \text{if } Tbpp < \eta_2 Tbpp_0 \end{cases}, \quad (10)$$

where $n_1$ and $n_2$ are parameters for bit consumption tuning.

With the clipping model (10), if the target bit per pixel of the remaining inter frames in the current intra period is significantly lower than the initial target bit per pixel, $Tbpp_0$, the current Pred_IQP should be increased to slow down the bit consumption, and vice versa. The deltaQP is used for the abnormal cases on the real-time available bandwidth, which is a compulsory setting for fast QP adaptation. To measure the significant changes on the target bit per pixel of the remaining inter frames in the current intra period, Tbpp, we may set the $n_1$ and $n_2$ parameters as 1.5 and 0.5, respectively.

As the initial QP predicted in the previous intra frame is utilized for effective initial QP clipping and the target bit per pixel of the remaining inter frames, which depends on the available bandwidth, is real-time updated, the aforesaid clipping model can help fast QP adaption and smooth quality.

The method and system for predicting initial QP for rate control in video coding may be implemented in apparatus such as high definition televisions, mobile or personal computing devices (e.g. "tablet" computer, laptop computer, and personal computer), kiosks, printers, digital cameras, scanners or photocopiers or user terminals having built-in or peripheral electronic displays. The apparatus comprises at least machine instructions for performing the algorithms; wherein the machine instructions can be executed using general purpose or specialized computing devices, computer processors, or electronic circuitries including, but not limited to, digital signal processors (DSP), application specific integrated circuits (ASIC), field programmable gate arrays (FPGA), and other programmable logic devices. The apparatus may also comprise computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

The foregoing description of the present invention has been provided for the purposes of illustration and description. It is not intended to be exhaustive or to limit the invention to the precise forms disclosed. Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method for predicting an initial quantization parameter (QP) for rate control in video coding, comprising:
   receiving an input video;
   extracting one or more feature vectors from the input video;

feeding the extracted feature vector into a machine learning model; and
predicting one or more initial QPs using the machine learning model,
wherein the feature vector extraction comprises:
determining an initial target bit per pixel, $Tbpp_o$, for an initial frame in the input video;
determining target bits per pixel for remaining frames, Tbpp, in the input video; and
a extracting a feature vector from the determined target bits per pixel for remaining frames, Tbpp, of the input video.

2. A method according to claim 1, wherein the initial target bit per pixel, $Tbpp_o$, is determined by:

$$Tbpp_o = \frac{TBR}{FR \times FP}$$

where TBR is the target bit rate, FR is the frame rate and FP is the number of pixels in a frame of the input video, respectively.

3. A method according to claim 2, wherein the target bits per pixel for remaining frames, Tbpp, is determined by:

$$Tbpp = \frac{Tbpp_0 \times AFN \times FP - \sum_{i=1}^{CFN} R_i}{(AFN - CFN) \times FP}$$

where AFN is the total number of frames, CFN is the number of coded frames and $R_i$ is the consumed bits of the i-th frame of the input video, respectively.

4. A method according to claim 1, wherein the machine learning model is trained by:
receiving a test video;
extracting sample data from the test video;
selecting an optimal initial QP from a plurality of initial QP on the basis of a criterion of performance optimization;
inputting the extracted sample data and corresponding selected optimal initial QP into the machine learning model; and
training the machine learning model to obtain a prediction function for initial QP.

5. A method according to claim 4, wherein the sample data extraction comprises:
setting a target bit rate for coding the test video;
determining an initial target bit per pixel, $Tbpp_o$, for an initial frame in the test video;
determining target bits per pixel, Tbpp, for remaining frames in the test video; and
extracting sample data from the determined target bits per pixel, Tbpp, for remaining frames.

6. A method according to claim 5, wherein the initial target bit per pixel, $Tbpp_0$, is determined by:

$$Tbpp_0 = \frac{TBR}{FR \times FP}$$

where TBR is the target bit rate, FR is the frame rate and FP is the number of pixels in a frame of the test video, respectively.

7. A method according to claim 6, wherein the target bits per pixel for remaining frames, Tbpp, is determined by:

$$Tbpp = \frac{Tbpp_0 \times AFN \times FP - \sum_{i=1}^{CFN} R_i}{(AFN - CFN) \times FP}$$

where AFN is the total number of frames, CFN is the number of coded frames and $R_i$ is the consumed bits of the i-th frame of the test video, respectively.

8. A method according to claim 4, wherein the optimal initial QP selection comprises:
coding the test video with one or more coding schemes having different initial QP values;
calculating a rate-distortion (R-D) performance score, $RDS_i$, for each of the coding schemes; and
selecting the optimal initial QP value which corresponds to the coding scheme achieving the highest R-D performance score.

9. A method according to claim 8, wherein the rate-distortion (R-D) performance score, $RDS_i$, for an i-th initial QP coding scheme is determined by:

$$RDS_i = \frac{C_F}{C_i} = \frac{R_F \cdot D_F}{R_i \cdot D_i}$$

where $R_F$, $D_F$ and $C_F$ are average consumed bits, mean square error (MSE) distortions and residual complexity indicator for a Fixed QP coding, respectively; and $C_i$ is the product of a pair of R-D date of the i-th initial QP coding scheme which is approximated by the model:

$$C_i = R_i \cdot D_i$$

where $R_i$ and $D_i$ are consumed bits and mean square error (MSE) distortions of the i-th initial QP coding scheme, respectively.

10. A method according to claim 1, wherein the machine learning model is a support vector regression (SVR) and the training the machine learning model comprises:
adopting a radial basis function (RBF) based kernel trick to produce a hyperplane defined by:

$$f(x) = \omega^T \phi(x) + b$$

where $\phi(\cdot)$ is the RBF kernel function, b is the bias term, and ω is highly related to the support vector coefficients which depict the relationship between the selected support vectors and the learned hyperplane;
minimizing a cost function, J, to achieve an optimal hyperplane, wherein:

$$J = \frac{1}{2}\|\omega\|^2 + C\sum_{i=1}^{n}(\xi_i + \xi_i^*), \text{ s.t. } \begin{cases} y_i - \omega^T\phi(x_i) - b \leq \varepsilon + \xi_i^* \\ \omega^T\phi(x_i) + b - y_i \leq \varepsilon + \xi_i \\ \xi_i, \xi_i^* \geq 0, \forall i = 1 \ldots n, \varepsilon \geq 0 \end{cases}$$

where $x_i$ and $y_i$ are extracted sample data and corresponding selected optimal initial QP for the i-th test video, respectively, n is number of data samples, $\zeta_i$ and $\zeta_i^*$ indicate slacks, ε is allowable error and data samples within the ε-tube which will not be penalized, parameter C defines the penalty factor for data samples outside the ε-tube, and parameter ε determines the sensitivity of error zone and thus influences the number of selected support vectors; and formulating a prediction function, H, based on the support vector, SV, corresponding support vector coefficients, SVCoef, and the bias parameter, b, which are obtained from the achieved optimal hyperplane, wherein:

$$Pred\_IQP = H(SV, SVCoef, \phi(x), b)$$

where x is an input feature vector extracted from and Pre_IQP is an initial QP predicted for an input video.

11. A method according to claim 10, wherein the prediction errors of the machine learning model are further minimized by tuning learning parameters {g, c} of the machine learning model by grid search, wherein g corresponds to kernel hyperparameter $\gamma$ in the RBF kernel function and c corresponds to a cost parameter, respectively.

12. A method according to claim 1, wherein
the input video comprises one or more of intra periods;
the initial QP for an initial intra frame of the first intra period is predicted using the machine learning model;
the initial QP for intra frames in each of following intra periods, Pred_IQP, are predicted using the machine learning model and then determined with a clipping function; wherein the clipping function has a clipping range denoted as [min_IQP, max_IQP] and defined by:

$$\min\_IQP = \begin{cases} Prev\_IQP - deltaQP, & \text{if } Tbpp > Tbpp_0 \\ Prev\_IQP, & \text{otherwise} \end{cases}$$

and $$\max\_IQP = \begin{cases} Prev\_IQP, & \text{if } Tbpp > Tbpp_0 \\ Prev\_IQP + deltaQP, & \text{otherwise} \end{cases},$$

where Prev_IQP is the previous initial QP predicted by the machine learning model for the intra frame at the previous intra period, deltaQP is the clipping parameter, $Tbpp_o$ and Tbpp are the initial target bit per pixel of the intra frame and the target bit per pixel of the remaining inter frames in a following intra period respectively.

13. A method according to claim 12, wherein the clipping parameter, deltaQP, is set to 2 or 3.

* * * * *